Sept. 4, 1945.  E. A. ZADIG  2,384,149
SPECTACLES
Filed June 18, 1943
FIG.1.
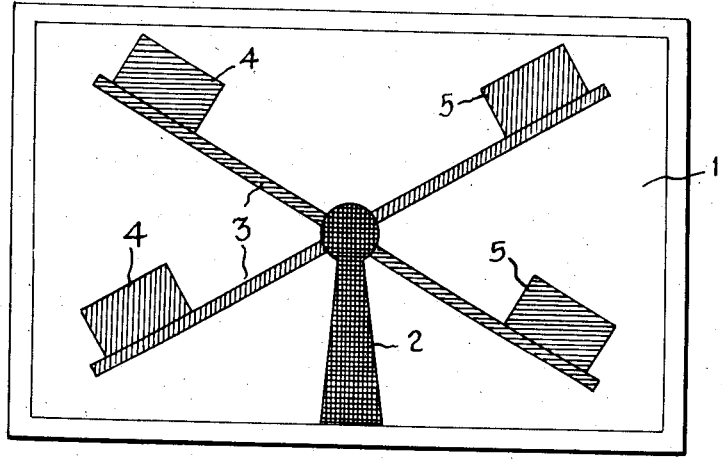
FIG.2. FIG.3.
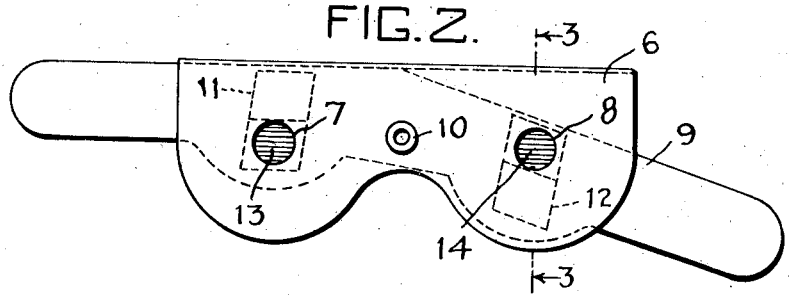 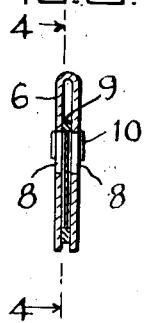
FIG.4.
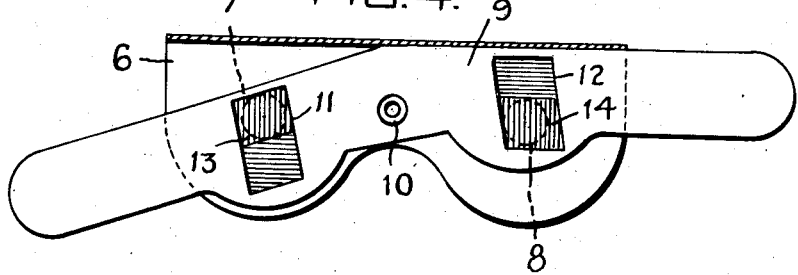
FIG.5. FIG.6.
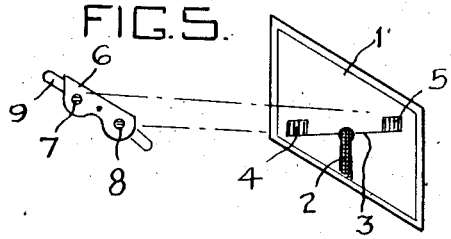 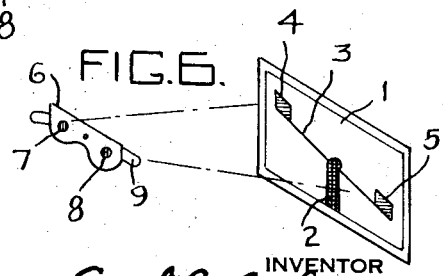
INVENTOR
Ernest A. Zadig
BY
Emery Varney, Whiteman & Dix
ATTORNEYS Patented Sept. 4, 1945

2,384,149

UNITED STATES PATENT OFFICE 2,384,149

SPECTACLES

Ernest A. Zadig, Norwalk, Conn.

Application June 18, 1943, Serial No. 491,330

1 Claim. (Cl. 88—16)

This invention relates to spectacles.

It is an object of the invention to provide spectacles by means of which an illusion of motion of objects on a printed page may be created by observing the printed page through such spectacles.

Other objects and advantages of the invention will appear hereinafter.

A preferred embodiment of the invention selected for purposes of illustration is shown in the accompanying drawing, in which, Figure 1 is a plan view of a suitably printed page.

Figure 2 is a front elevation of a pair of spectacles for observing said page.

Figure 3 is a section on the line 3—3 of Figure 2.

Figure 4 is a view similar to Figure 2, with the frame broken away, and the lens holder moved to a different position.

Figures 5 and 6 are perspective diagrams illustrating the results of use of the spectacles.

Referring to the drawing, 1 represents a page of a book, for example, on which a suitable design is printed in colors. The design illustrated, for example, is a see-saw in which the fixed support 2 is printed in black, and the movable teeter board 3 and the objects 4 and 5 supported on the ends thereof are shown in two positions, one position being printed in a color other than black, as for example red, and the other position being printed in a different color other than black, as for example blue.

Referring now to Figures 2, 3 and 4, I provide spectacles for observing such a printed page, such spectacles comprising a U-shaped frame 6 of opaque material such as metal or cardboard, for example, both legs of the U having properly spaced eye apertures 7 and 8 therein. A lens holder 9 is movably mounted on the frame as by pivoting it on a rivet 10, the oscillating movement of the holder on its pivot being limited in both directions by engagement of the oppositely inclined upper edges thereof with the holder.

The lens holder is provided with spaced apertures 11 and 12 registering with the apertures 7 and 8 throughout the entire permissible movement of the holder. Mounted in or over the apertures 11 and 12 are bi-colored lenses 13 and 14 of suitable transparent material such as colored glass or Cellophane for example, the colors of such lenses being similar to the colors in which the two positions of the movable objects 3, 4 and 5 are printed on the page 1. Thus, in the embodiment illustrated where the two positions are printed in red and blue, the bi-colored lenses should be red and blue, with substantially one half of each lens red, and the other half blue, and with the positions of the colors reversed, i. e. the red portion of the lens 13 is at the top of the aperture 11, the red portion of the lens 14 is at the bottom of the aperture 12, and vice versa as to the blue portions of the lenses.

In use, the spectacles are held in front of the eyes and the printed page is observed through the colored lenses. By moving the lens holder 9 through its permissible movement, an illusion of movement of the objects on the printed page is created. Thus, when the lens holder is in the position illustrated in Figure 2, the blue portions of the lenses are in register with the eye apertures 7 and 8, and in observing the printed page, the position of the objects which is printed in blue becomes substantially invisible, so that as shown diagrammatically in Figure 5, the observer sees only the stationary support which is printed in black and the position of the movable object which is printed in red. When the lens holder is moved to the position illustrated in Figure 4, the red portions of the lenses are in register with the eye apertures 7 and 8, and the position of the objects which is printed in red becomes substantially invisible, so that as shown diagrammatically in Figure 6, the observer sees only the stationary support which is printed in black and the position of the movable object which is printed in blue. Thus by moving the lens holder back and forth while observing the printed page, an illusion of movement is created.

It will be understood that the invention may be variously modified and embodied within the scope of the subjoined claim.

I claim as my invention:

Spectacles for observing a page having objects printed thereon in different colors, two different positions of a movable object being printed in two different colors, said spectacles comprising a frame consisting of sheet material folded to U-shape, the legs of the U having spaced registering eye apertures therethrough, a lens holder pivotally mounted on said frame between said eye apertures, said lens holder being positioned between the legs of said frame and having a portion extending outwardly of the frame to provide an actuating member, said lens holder carrying a pair of bi-colored lenses registering with said eye apertures, the two colors of said lens being similar to the colors of said printed objects, the respective positions of the similarly colored portions of said lenses being reversed, so that on oscillation of said lens holder on its pivot, the two similarly colored portions of each of said lenses may be brought into register with said eye apertures on oscillation in one direction and the other two similarly colored portions of each of said lenses may be brought into register with said eye apertures on oscillation in another direction, the fold in said U-shaped frame cooperating with the upper edge of said lens holder and serving to limit the oscillating motion of said lens holder in both directions to stop such oscillating motion when similarly colored portions of said lenses are in register with said eye apertures.

ERNEST A. ZADIG.